March 9, 1948.    C. S. McCARTHY    2,437,396
BRAKE APPLYING MECHANISM
Filed Dec. 28, 1944    3 Sheets-Sheet 1
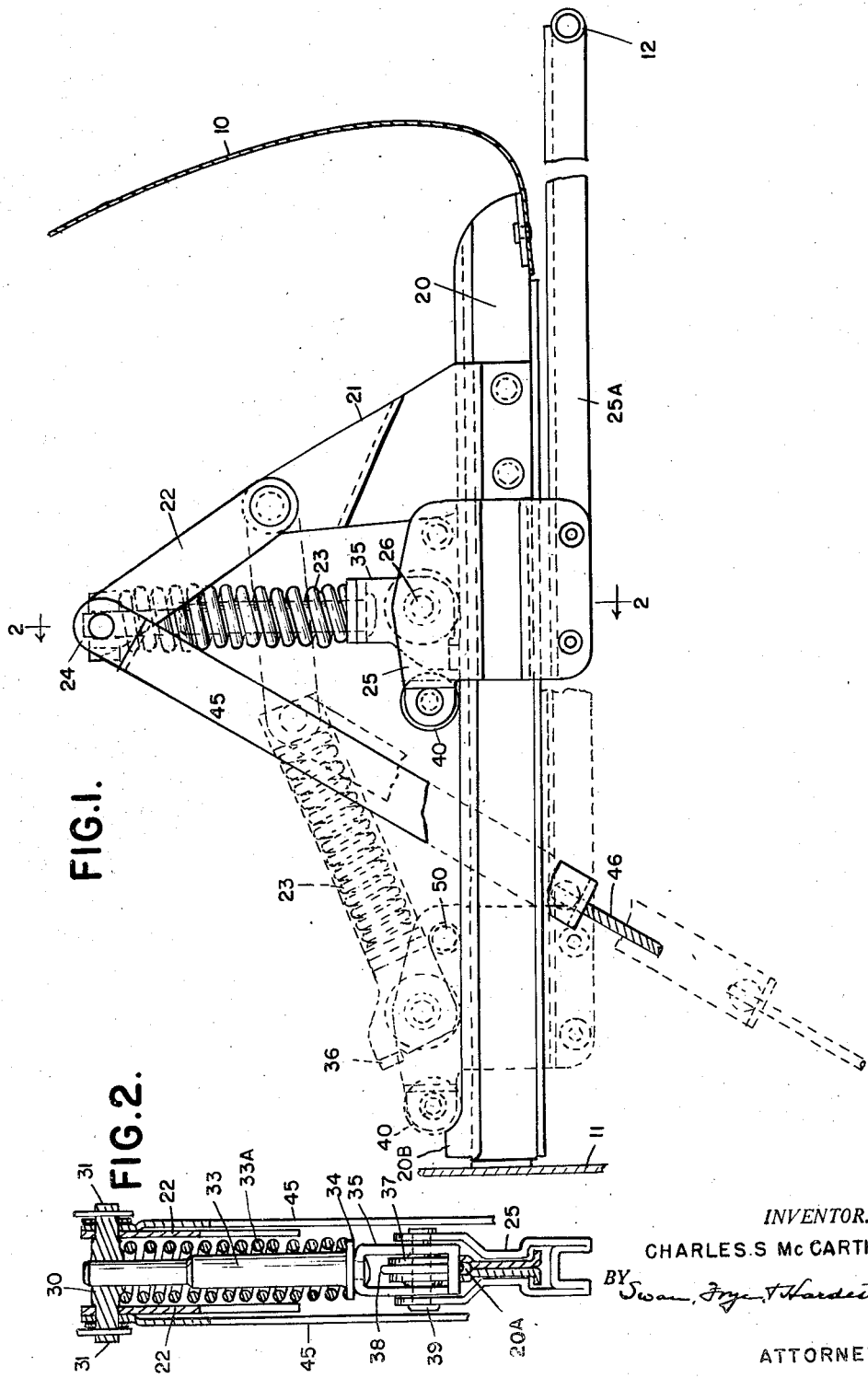
INVENTOR.
CHARLES S. McCARTHY
BY Swan, Frye & Hardesty
ATTORNEYS

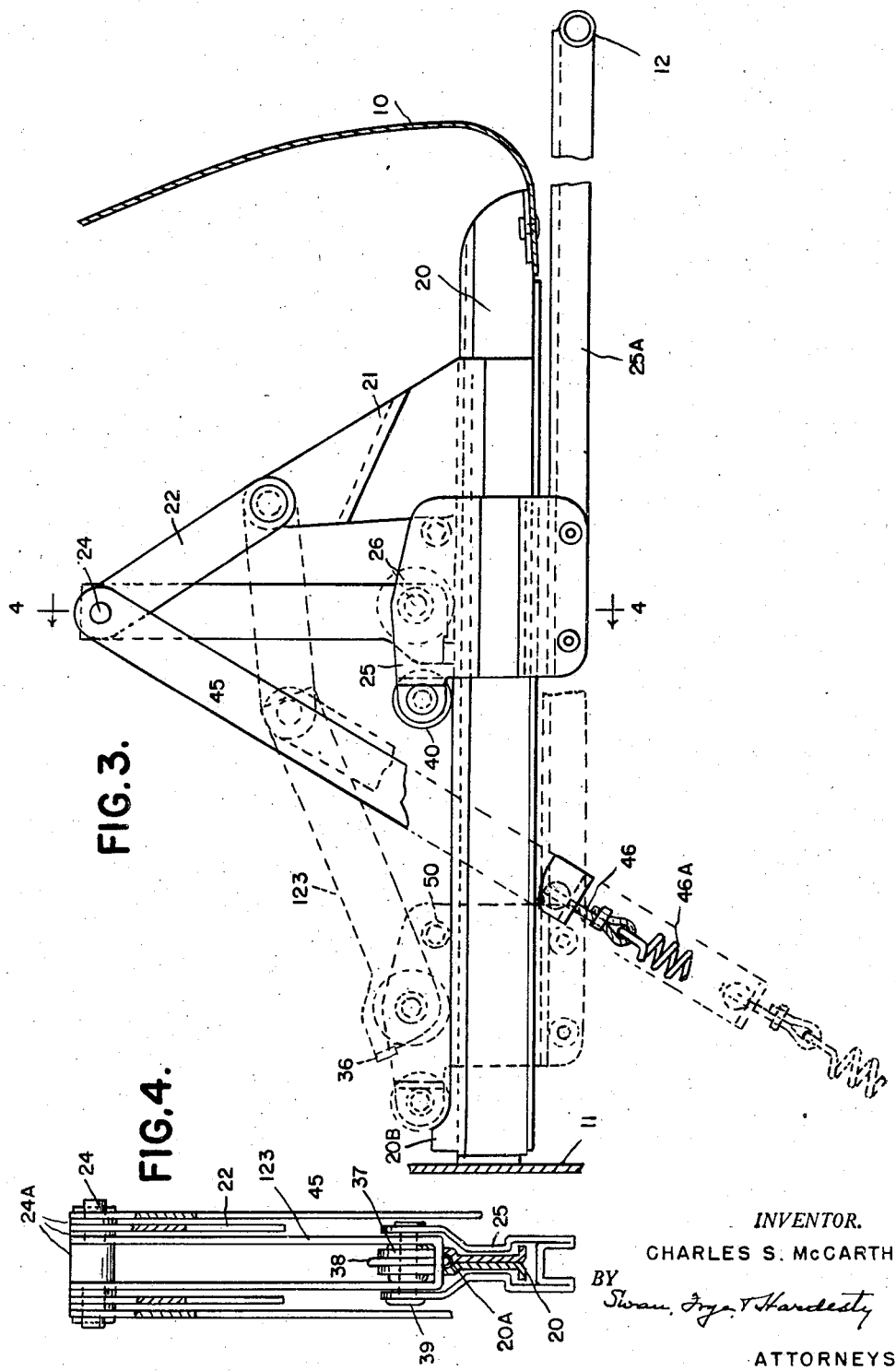

March 9, 1948.   C. S. McCARTHY   2,437,396
BRAKE APPLYING MECHANISM
Filed Dec. 28, 1944   3 Sheets-Sheet 3
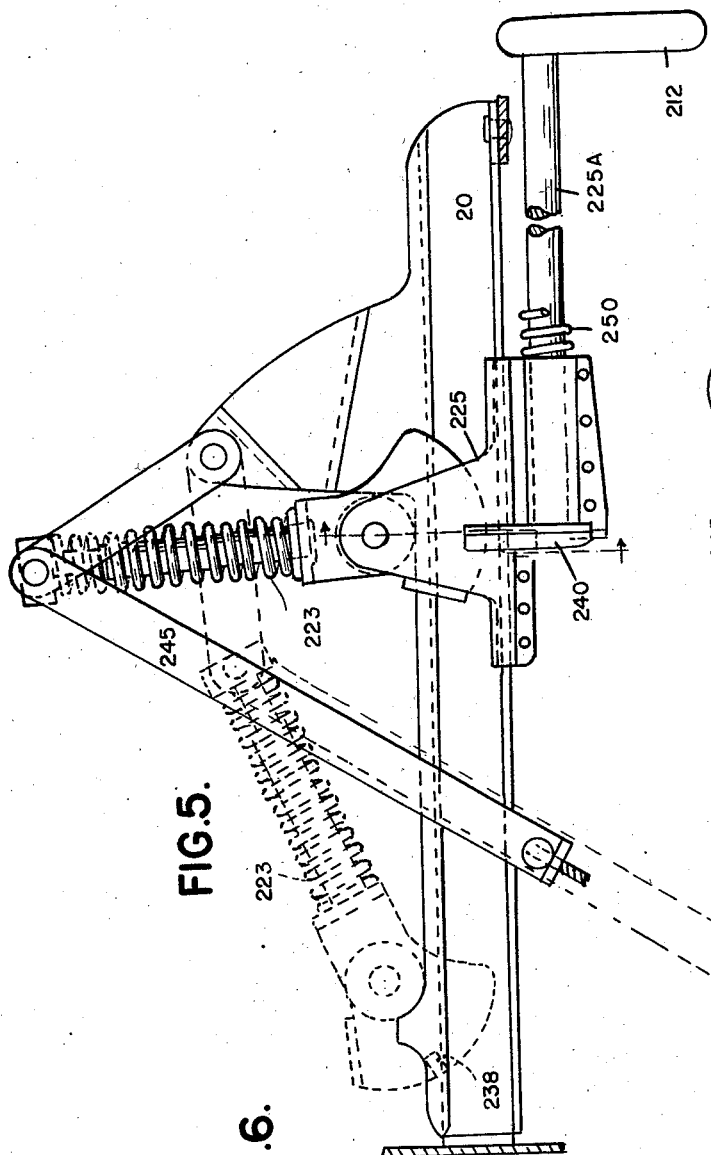
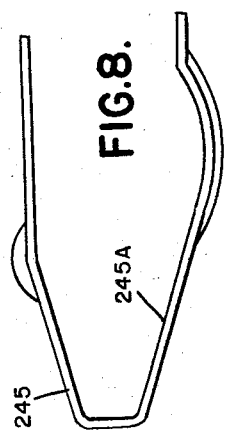
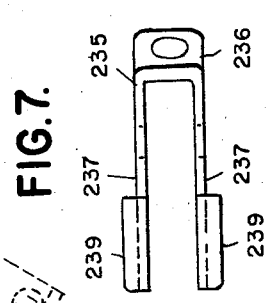
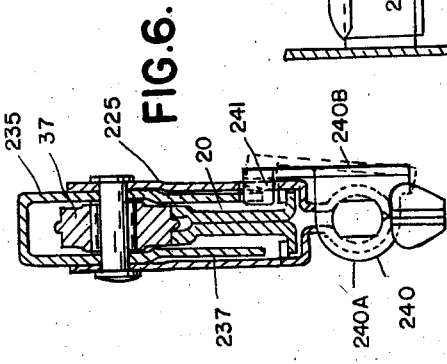
*INVENTOR.*
CHARLES S. McCARTHY
BY Swan, Frye & Hardesty
ATTORNEYS Patented Mar. 9, 1948

2,437,396

UNITED STATES PATENT OFFICE 2,437,396

BRAKE APPLYING MECHANISM

Charles S. McCarthy, Birmingham, Mich., assignor to American Forging and Socket Company, Pontiac, Mich., a corporation of Michigan Application December 28, 1944, Serial No. 570,082

13 Claims. (Cl. 74—516)

The present invention relates to brake levers or more specifically to a means for actuating the brakes of a vehicle.

In the conventional brake actuating means substantially universal use is made of a hand lever (or foot pedal) having a constant ratio or of a straight pull or push type of mechanism also with a constant ratio, the same leverage existing throughout the movement of the lever or handle.

In the operation of the brakes, however, little application of power is required during the early portion of the handle movement, as there is more or less lost motion or cable slack to be taken up. It is only during the later part of the handle movement that much power need be used as it is only then that the brakes are actually being applied. This being the case, it would be desirable to provide for a quick early movement of the brake handle and an increased leverage in the later movement.

Among the objects of the present invention is to provide a means giving such result by mechanism having a variable leverage ratio increasing toward the brake applying end of the stroke.

Another object is a brake applying means having a variable leverage ratio that increases with cable load or with increase in resistance due to brake application.

Another feature of the conventional brake operating lever or pull is that some sort of ratchet or similarly acting means must be provided to maintain the brake application. Such means may be the cause of serious accidents if it should fail or if the operator should neglect to assure its use.

Another object of the present invention therefore is brake operating means that is self-locking in brake applied position.

Still another object is brake locking means which is completely automatic so that the operator can not fail to lock the brakes.

Other objects and advantages will be apparent to those skilled in the art upon reference to the following description and the accompanying drawings in which Figure 1 is a side elevation of means embodying the present invention, the figure showing the parts in two positions.

Figure 2 is a section on line 2—2 of Figure 1.

Figure 3 is a side elevation of a modified form.

Figure 4 is a section on line 4—4 of Figure 3.

Figure 5 is a side elevation of another form of embodiment of the invention.

Figure 6 is a section on line 6—6 of Figure 5.

Figures 7 and 8 are views of details of construction of the construction shown in Figure 5.

In the drawings there are indicated brakes operated by means of a cable but it should be understood that the handle mechanism shown may be used with suitable linkage if desired. The mechanism shown in the drawing may be mounted in suitable fashion under the instrument board 10 and secured to the dash 11 of a vehicle with the hand grip 12 below the board 10 and in an accessible position. As shown, the mechanism consists of a track or rail 20 preferably made by fixing together back-to-back two channel members of suitable form so as to provide a groove 20A along the upper edge of the track.

This track 20 has fixed thereto, at a suitable location near the forward end, a standard 21 at the upper end of which is attached in swinging or hinged relation a short link 22. The link 22 is one portion of a toggle of which the other member is a somewhat longer link 23, the two links being hinged together, at 24, and link 23 is, at its other end hinged to the slide member 25 as at 26.

It will be noted from Figure 2 that link 22 is composed of two side portions which may or may not be integrally connected by a back portion, but are in any event spaced from each other by a perforated block 30 carrying laterally projecting pins 31 which pass through the ends of the two side arms of the link.

The link 23, as shown in Figure 2, consists of a pin 33, the upper end of which passes loosely through the block 30 and the lower end 34 of which is enlarged or headed and fixed to a stirrup 35 carrying a heel 36, the purpose of which will appear later. Surrounding pin 33 is a quite heavy compression spring 33A carried between the block 30 and the head 34, calibrated or selected to equal the desired maximum pull to be exerted on the brakes.

The stirrup 35 is of sufficient width to accommodate a small roller 37 having a peripheral rib 38 adapted to coact with the groove 20A in track 20 and both stirrup 35 and roller 37 are mounted in the slide 25 by a through pin 39 forming the axis of the roller and located in line with the axis of pin 33.

The slide 25 is also provided with a small additional roll 40 to aid in minimizing the friction of the slide on the track and also to cooperate with the curved up end 20B of the track 20 in limiting the movement of the slide so as to prevent the aligning of the toggle links. To the lower portion of the slide is fixed the extension member 25A carrying the hand grip 12.

It will also be noted from Figure 2 that the block 30 and pins 31 carry the two upper ends of a stirrup or link 45 to the lower end of which is secured the brake operating cable 46.

In the operation of the present device, assuming the brakes to be "off," the parts will be in the dotted line position of Figure 1, the toggle 22—23 being nearly straight.

When the brakes are to be applied, pulling the handle 12 and moving the slide 25 to the right, Figure 1, first causes the toggle 23 to move toward its vertical position and thereby draw up on cable 46. By the time that the slide has moved roughly about one third of its travel, the lost motion or slack in the brake mechanism has been taken up since in this part of its movement, the link 23 has nearly reached its vertical position.

Further movement of the slide 25 will result in further upward movement of the cable, but at greatly increased leverage, until link 23 becomes vertical, at which time the cable 46 will have had its maximum movement.

Still further movement of the slide 25 will result in moving the lower end of link 23 beyond vertical alignment and, consequently, spring 33A and cable resistance tend to force the slide 25 further to the right rather than resist movement of the slide. However, only a small movement beyond center is permitted since the heel 36 strikes the track and acts as a stop. The movement beyond center of link 23 is sufficient, however to lock and maintain locked the cable 46 in its upward position.

It should be noted that in applying the brakes, if the operator fails to move the handle 12 to its extreme forward position, that is, if he stops short of moving the link 23 to its vertical position, the toggle will immediately return to its straightened position when pull on the handle ceases. He is, therefore, always put on notice by the handle itself as to the locked or unlocked condition of the brakes.

In the operation of the device just described, the spring 33A is compressed more or less depending upon the amount of slack or lost motion to be taken up. In cases where the amount of slack is small, the maximum compression of spring 33A occurs sooner than in those cases where the slack is greater. When, therefore, the amount of slack is small, the slide 25 and handle 12 move a shorter distance in fully applying and locking the brakes than they do when there is more slack. The leverage however increases in the same way but in greater degree.

In the form of the device shown in Figures 3 and 4, the device is identical in most respects with that of the other figures. In this form, however, there is no spring forming a part of the toggle but a spring providing for yield in the brake applying pull is placed in the cable 46. This spring 46A may be either a tension or compression spring.

In this form of the device, the toggle link 123 may be a simple U-shaped member embracing the roller 37 and pivoted or hinged to slide 25 by the pin 39. The other end of the link 123 is hinged to link 22 by a suitable pin 24 which, as in the other form, carries also the stirrup 45, suitable spacers or washers 24A being used.

In this form of the device, the effective length of link 123 is always the same and consequently the amount of movement of slide 25 does not vary regardless of the amount of slack in cable 46, therefore, the extreme forward movement of the slide 25 may be limited by heel 36 or this may be omitted and the standard 21 used as a stop.

In the form of device shown in Figures 5 to 8, the operating elements are identical in principle with those of Figures 1 and 2, but are shown as somewhat different in detail and with an added feature—an additional locking means designed to eliminate brake release by any chance or jarring or accidental push on the handle. In this form, which is the preferred form, of the device, the track 20 may be substantially identical with the previously described tracks and the same may be said for links 22, and parts of link 23.

In Figure 5 the make-up of link 223 is the same as link 23, except that the stirrup is of the form shown at 235, Figures 5 to 7. This stirrup consists of a top portion 236, to which is fixed the post 33, and depending side plates 237 between which is mounted the guide roller 37, while the side plates extend downwardly beyond the roller and are, as shown in Figure 5, segmental in form, with one of said plates notched as at 238 and both of which are provided with outwardly turned portions 239 at their rearward edges.

The slide 225 is likewise somewhat different, in that it extends well below the track 20 and is formed to receive the end of the rod 225A carrying the handle 212. This rod 225A extends through the formed portion of the slide and has fixed thereto a latch member 240, two views of which are shown in Figures 5 and 6. This latch member 240 consists of a disc portion 240A, fixed to rod 225A, and an arm portion 240B extending sufficiently high to be opposite the segmental portions of stirrup 235. At its upper end this arm portion is provided with a lug or nose 241 which projects through a suitable slot in the side wall of the slide 225 and contacts that one of said segmental portions of stirrup 235 which is notched at 238. This notch 238 is in such position that when the brakes are fully on and locked due to the position of link 23, the notch is in position to be engaged by the nose 241. Further, in such a position of link 23, the wings 239 engage the edges of the slide 225 to prevent further movement thereof, as shown in Figure 5.

In order to provide that the latch 240 will enter and remain in the notch 238, the rod 225A may be resiliently urged toward rotation by means of a suitable spring 250 mounted on the rod and having one end fixed thereto while the other end of the spring is fixed to the slide. Further, in order to permit the slide to move freely from one end of the track to the other, the cable link or stirrup 245 is formed with its lower end bowed outwardly as at 245A (Figure 8).

In the operation of this form of device, the parts function exactly as they do in the form of Figures 1 and 2, but in addition the latch 240 maintains the parts in the full line position of Figure 5 until released by a partial rotation of handle 212 and until the handle is thrust inwardly to move link 223 from its vertical position.

I claim:

1. In brake operating means an element connected in operative relation to and movable to apply said brakes, a stationary rail, a slide movable lengthwise thereof, a link pivoted at one end to said slide and at its other end to said movable element, a stationary standard, a fulcrum link pivoted at one end to said standard and at its other end to both said element and said first-mentioned link, means for moving said slide and links, whereby to cause said first-mentioned link to change position from an initial position at an acute angle with said rail toward normalcy therewith when said slide is moved in one direction to thereby move said brake applying element.

2. In brake operating means an element connected in operative relation to and movable to apply said brakes, a stationary rail, a slide movable lengthwise thereof, a link pivoted at one end to said slide, and at its other end to said movable element, a stationary standard, a fulcrum link pivoted at one end to said standard and at its other end to both said element and said first-mentioned link, means for moving said slide and links, whereby to cause said first-mentioned link to change position from an initial position at an acute angle with said rail toward and beyond a position normal to said rail to thereby move said brake applying element and means to limit the movement of said first-mentioned link beyond the normal position.

3. In vehicle brake applying means, a substantially horizontal rail, a slide thereon, a standard fixed thereto, a toggle pivoted at one end to said slide and at its other end to said standard, means for maintaining said toggle in slight upwardly bent condition and in near parallel relation to said rail when said brakes are idle, brake operating means connected to the intermediate pivot of said toggle, means for manually moving said slide toward said standard whereby said toggle is bent further upwardly and said brake operating means is actuated.

4. In vehicle brake applying means, a substantially horizontal rail, a slide thereon, a standard fixed thereto, a toggle pivoted at one end to said slide and at its other end to said standard, means for maintaining said toggle in slight upwardly bent condition and in near parallel relation to said rail when said brakes are idle, brake operating means connected to the intermediate pivot of said toggle, means for moving said slide toward said standard whereby said toggle is bent further upwardly and said brake operating means is actuated, and stop means operative to prevent further movement of that member of the toggle pivoted to the slide when it has proceeded beyond a vertical position.

5. In brake operating means an element connected in operative relation to and movable to apply said brakes, a stationary rail, a slide movable lengthwise thereof, a longitudinally resilient link pivoted at one end to said slide and at the other end to said movable element, means for moving said slide and link, and means to cause said link to change position from an initial position at a small acute angle with said rail to normality therewith when said slide is moved in one direction to thereby move said brake applying element.

6. In brake operating means an element connected in operative relation to and movable to apply said brakes, a stationary rail, a slide movable lengthwise thereof, a longitudinally resilient link pivoted at one end to said slide and at its other end to said movable element, means for moving said slide and link, means to cause said link to change position from an initial position at a small acute angle with said rail to and beyond a position normal to said rail to thereby move said brake applying element and means to limit the movement of said link beyond the normal position.

7. In vehicle brake applying means, a substantially horizontal rail, a slide thereon, a standard fixed thereto, a toggle pivoted at one end to said slide and at its other end to said standard, that link of said toggle pivoted to said slide being longitudinally resilient, means for preventing movement of said slide away from said standard beyond a position wherein said toggle is in slight upwardly bent condition and in near parallel relation to said rail, brake operating means connected to the intermediate pivot of said toggle, means for moving said slide toward said standard whereby said toggle is bent further upwardly and said brake operating means is actuated.

8. In brake operating means, a toggle, brake actuating means connected to the joint of said toggle, means preventing movement of said toggle into full alignment when the brakes are idle, means for moving the ends of said toggle toward each other whereby to move said toggle members further out of alignment to thereby move said brake actuating means, and means to stop said toggle movement when it has proceeded beyond predetermined desired movement of the said joint.

9. In vehicle brake applying means, a substantially horizontal rail, a slide thereon, a standard fixed thereto, a toggle pivoted at one end to said slide and at its other end to said standard, means for preventing movement of said slide away from said standard beyond a position wherein said toggle is in slight upwardly bent condition and in near parallel relation to said rail, brake operating means connected to the intermediate pivot of said toggle, means for moving said slide toward said standard whereby said toggle is bent further upwardly and said brake operating means is actuated, and latch means operable to retain said slide in a position adjacent said standard.

10. In vehicle brake applying means, a substantially horizontal rail, a slide thereon, a standard fixed thereto, a toggle pivoted at one end to said slide and at its other end to said standard, means for preventing movement of said slide away from said standard beyond a position wherein said toggle is in slight upwardly bent condition and in near parallel relation to said rail, brake operating means connected to the intermediate pivot of said toggle, means for moving said slide toward said standard whereby said toggle is bent further upwardly and said brake operating means is actuated, stop means operative to limit movement of that member of the toggle pivoted to the slide beyond a vertical position, and latch means operable to retain the last mentioned toggle member adjacent said stop means.

11. In brake operating means an element connected in operative relation to and movable to apply said brakes, a stationary rail, a slide movable lengthwise thereof, a longitudinally resilient link pivoted at one end to said slide and at the other end to said movable element, means for moving said slide and link, and means to cause said link to change position from an initial position at a small acute angle with said rail to normality therewith when said slide is moved in one direction to thereby move said brake applying element, and coacting latch parts carried by said slide and link operable to retain the elements in brake applied position.

12. In vehicle brake applying means, a substantially horizontal rail, a slide thereon, a standard fixed thereto, a toggle pivoted at one end to said slide and at its other end to said standard, that link of said toggle pivoted to said slide being longitudinally resilient, means for preventing movement of said slide away from said standard beyond a position wherein said toggle is in slight upwardly bent condition and in near parallel relation to said rail, brake operating means connected to the intermediate pivot of said toggle, means for moving said slide toward said standard whereby said toggle is bent further upwardly and said brake operating means is actuated, and coacting latch parts carried by said slide and adjacent link operable to retain the elements in brake applied position.

13. Brake applying mechanism including an actuating member connected to the brakes for applying same, a handle, means for guiding the handle in substantially horizontal movements, and means arranged between the handle and actuating member for moving the actuating member through gradually decreasing distances per unit of travel of the handle as the brakes are applied, said means including a spring-assisted toggle lever mechanism pivotally connected to both the handle and actuating member.

CHARLES S. McCARTHY.

REFERENCES CITED

The following references are of record in the file of this patent:

UNITED STATES PATENTS

| Number | Name | Date |
| --- | --- | --- |
| 653,285 | Cole | July 10, 1900 |
| 776,521 | Levin | Dec. 6, 1904 |
| 1,356,032 | Angus | Oct. 19, 1920 |
| 1,617,832 | Adams | Feb. 15, 1927 |
| 1,698,656 | Ream | Jan. 8, 1929 |
| 2,171,403 | Orschelen | Aug. 29, 1939 |
| 2,245,252 | Cleghorn | June 10, 1941 |